United States Patent
Götz et al.

(10) Patent No.: US 7,567,706 B2
(45) Date of Patent: Jul. 28, 2009

(54) ULTRA LIGHT WEIGHT BROWSER

(75) Inventors: Norbert Götz, Heidelberg (DE); Hermann Stamm-Wilbrandt, Eberbach (DE)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/542,666

(22) PCT Filed: Mar. 16, 2004

(86) PCT No.: PCT/EP2004/050312

§ 371 (c)(1), (2), (4) Date: Jul. 18, 2005

(87) PCT Pub. No.: WO2004/086761

PCT Pub. Date: Oct. 7, 2004

(65) Prior Publication Data

US 2006/0056686 A1    Mar. 16, 2006

(30) Foreign Application Priority Data

Mar. 27, 2003   (EP)   ................................. 03100802

(51) Int. Cl.
*G06K 9/36* (2006.01)
(52) U.S. Cl. ............ 382/166; 382/167; 382/162; 382/232; 382/299; 382/300
(58) Field of Classification Search .......... 382/232, 382/233, 166, 167, 162, 299, 300; 345/589, 345/590, 616
See application file for complete search history.

(56) References Cited

U.S. PATENT DOCUMENTS

| | | | | |
|---|---|---|---|---|
| 5,978,511 A | * | 11/1999 | Horiuchi et al. | 382/241 |
| 6,396,505 B1 | * | 5/2002 | Lui et al. | 345/613 |
| 6,587,583 B1 | * | 7/2003 | Kurzweil et al. | 382/164 |

OTHER PUBLICATIONS

Gilbert J M et al: "Globally Progressive Interactive Web Delivery" INFOCOM '99. Eighteenth Annual Joint Conference of the IEEE Computer and Communication Societies. Proceedings. IEEE New York, NY 21-25 Mar. 1999, pp. 1291-1299.

(Continued)

*Primary Examiner*—Matthew C Bella
*Assistant Examiner*—Ali Bayat
(74) *Attorney, Agent, or Firm*—Schmeiser, Olsen & Watts; William H. Steinberg

(57) ABSTRACT

The present invention relates to the field of computer technology, and in particular to a method and system for compressing digital data from a row-column structured, multi-color bitmap image representation and to advantageous applications thereof for low bandwidth data communication. In order to increase the compression rate in particular of bitmaps corresponding to screen shots in web-based applications or standard desktop applications having a graphical user interface (GUI) it is proposed to reduce (210) the image representation in order to contain only a subset of colors, preferably 2, 4, 8, 16 . . . 256, before subjecting it to further compression steps (215, 260, 265) and comprising rowwise X-OR operations (215) and subsequent compressed mapping (240, 245) of the resulting pixel information into a respective compressed bit string. X-OR operations in column direction (220) are also added in order to improve the compression rate for the specific field of above said low bandwidth communications.

20 Claims, 5 Drawing Sheets

MOBILE ACCESS TO INTRANET/
APPLICATION CONTROL

OTHER PUBLICATIONS

Tong F H F et al: "A New Progressive Colour Image Transmission Scheme for the World Wide Web" Computer Networks and ISDN Systems, North Holland Publishing. Amsterdam, NL, vol. 30, No. 20-21, Nov. 12, 1998, pp. 2059-2064.

Gormish M J ED—Institute of Electrical and Electronics Engineers: "Compression of Palettized Images by Color", Proceedings of the International Conference on Image Processing. (ICIP). Oct. 23-26, 1995, vol. 3, Oct. 23, 1995, p. 274-277.

* cited by examiner

MOBILE ACCESS TO INTRANET/
APPLICATION CONTROL

| | gif | fcf | fcf/gif(%) |
|---|---|---|---|
| pic1 | 27091 | 15950 | 58.9 |
| pic2 | 31025 | 16662 | 53.7 |
| pic3 | 36265 | 18625 | 51.4 |
| pic4 | 27336 | 19622 | 71.8 |
| pic5 | 40042 | 23899 | 59.7 |
| pic6 | 34411 | 21702 | 63.1 |
| pic7 | 35381 | 22268 | 62.9 |
| sum | 231551 | 138728 | 59.9 |
| avg | 33079 | 19818 | |

COMPRESSION RESULTS

ULTRA LIGHT WEIGHT BROWSER

1. BACKGROUND OF THE INVENTION

1.1. Field of the Invention

The present invention relates to the field of computer technology, and in particular to a method and system for compressing digital data from a row-column structured, multi-color bitmap image representation and to advantageous thereof for low bandwidth data communication.

1.2. Description and Disadvantages of Prior Art

A prior art compression scheme is published in a scanner handbook of CHINON INDUSTRIES, INC., "IMAGE SCANNER", TECHNICAL REFERENCE MANUAL, N-207, DS-3000, published by SHENON INDUSTRIES in 1988 and available from SHENON AMERICA, INC. INFORMATION EQUIPMENT DIFF., 660 MAPLE AVENUE, TORRANCE, CA 90503 U.S.A.

In order to provide for an effective, two-dimensional data compression scheme it is proposed in this prior art method to generally reduce the data volume and respective transmission time volume by the following basic compression scheme: The data in one line is divided into 8 bits. When all 8 bits are "0", they will be skipped. Otherwise, the 8 bits will be transmitted as compression coding "1". If the maximum data of for example 316 bytes in one line is coded, the data is expressed by the compression codes of 40 bytes, whereby the least significant 4 bits of the last byte has no meaning. If the compression codes of 40 bytes are compressed two more times the codes are compressed to 1 byte. In other words, a byte having one or more "1" bits is mapped to a bit value of "1", and the byte is stored in a retrievable manner, preferred directly behind said compressed string and a byte only consisting of "0" bits is mapped to a "0" bit value. In order to adapt this basic compression method to the above-mentioned two-dimensional image representations this prior art publication proposes a bit-wise EXCLUSIVE OR (X-OR) operation between respective bits or pixels of subsequent rows in a row-column structured bitmap representation. That means when previous row-bits or pixels in the same column position are identical, then a "0" is the X-OR result, whereas if the two bits are different, then a "1" is the X-OR operation result. The X-OR operation is done line-wise (row-wise) before the execution of the before-mentioned one-dimensional data compression).

A disadvantage of this prior art compressing method is that it is not efficient enough for compressing image representations, which occur typically in GUI-oriented program applications and handles only black and white pictures.

According to a second aspect of the present invention such compressed data is frequently communicated via networks, either having lower or larger bandwidths. For example, when using an Intranet and browsing some portal, much transmission time is spent for transmitting the large amount of data needed for the end-user to see a multicoloured, high resolution graphic at his terminal device. In particular, if said device is coupled via a low bandwidth line, this takes an intolerable time until a user sees a GUI-structured screen at his terminal device. Having for example a transmission rate of 9.6 Kbits per second, the transmission time for a portal screen may be roughly six minutes.

Also for remote application control between such low bandwidth-coupled, maybe handheld terminal device and a backend application server the same problem exists.

1.3. Objectives of the Invention

It is thus an objective of the present invention to provide an improved compressing method and its advantageous use for networked applications.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to its first primary aspect the present invention discloses to quantisize the image representation, to contain only a reduced number of colours, preferably a low number of colours as are 2, 4, 8, 16 . . . 256, whereby the bitmap bits associated with one single colour define a respective subset of bitmap bits. Each of said subsets is then subjected to the above-mentioned X-OR based compression—or further compression steps—and to the subsequent bit-string coding step. The idea behind is that in particular when web-based applications are considered or networked applications in general, that it is not necessary, primarily to see the screen with all details and in an multi-colour true type aspect thereof, in particular when the actually transmitted screen is only used for navigating between some screens, as during simple navigation, in most cases, a high resolution, or true type aspects of the transmitted screen or web-page are not really needed. It is thus proposed as a first step, to reduce the image representation to a low number of colours, for example a grey scale of 2 or 4 grey colours as are for example white, light grey, dark grey and black, giving a grey scale of a total of 4 colours.

When further, a second X-OR operation is applied in a second direction perpendicular to the direction of the first X-OR operation, then particular advantages are achieved when typical GUI-like screenshots are compressed. This is due to the fact, that in such screens which everybody knows from his own desktop the basic graphical structures are windows which contain most often perpendicular, uni-coloured areas, which are intersected or overlaid by text information. For this specific typical shape said second X-OR operation is performed after the before-mentioned first X-OR operation. The result is an additional compression of the order of 10% in typical GUI-based screens.

Further advantageously, the compression result, which is obtained by the above-mentioned measures, is advantageously followed by a further compression step according to the invention. The further compression may for example be a Huffman compression or a further compression referred to herein as "LZ77" compression, which is publicly available under the URL: www.qzip.org/zlib/, and is described in further detail under the URL: www.qzip.org/zlib/feldspar.html. Further, both, Huffman coding and LZ77 coding may advantageously combined, in which combination the order does not play a role.

According to the second primary aspect of the present invention in a server-client communication process a method for performing a low bandwidth transmission of a multi-colored bitmap image representation of graphical user-interface (GUI) data, is disclosed, for both, the server site, and the client site, whereby the server site method is characterized by the steps of:
a) determining at least a primary and a secondary subset from the subsets generated by compression as mentioned above,
b) transmitting bits corresponding to a primary subset of the reduced-color pixels of said bitmap image representation in a first transmission process,
c) transmitting bits corresponding to a secondary subset of the pixels of said bitmap image representation in a second transmission process subsequent to the first one. Of course, the above step a) will in most cases mean to associate the most important information, ie the most relevant information to the user with the primary subset, in order to make it appear first at the client device. This is in most cases text information. Nevertheless, dependent of the actual particular application, also graphical information may be transmitted first, if this is will be exceptionally desired, for example after having passed some filter criteria, like e.g. "select only circles of a predetermined size range and color". It is to be understood that the scope of the present invention will cover all those applicational aspects.

At the client site, in a server-client communication process a method for participating in a low bandwidth transmission of a multi-colored bitmap image representation of graphical user-interface (GUI) data is disclosed, which plays the respective client counterpart role of the above mentioned method, which is characterized by the steps of:
a) receiving (340) bits corresponding to a primary subset of the reduced-color pixels of said bitmap image representation (40) from a first transmission process,
b) performing uncompression steps on said received bits reversing a respective compression as it was mentioned above,
c) displaying a bitmap image representation corresponding to said first primary subset,
d) subsequently, receiving (355) bits corresponding to a secondary subset of the pixels of said bitmap image representation (40) from a second transmission process subsequent to said first one,
e) performing uncompression steps on said subsequently received bits reversing a respective compression as it was mentioned above,
f) displaying a bitmap image representation corresponding to said secondary subset together with the bitmap image representation displayed from said first transmission process. Thus, most important information of said bitmap image representation may be transmitted first, which provides for a significant saving of transmission time.

Further, the following step may be performed advantageously at the client:
filling-in grey scale pixels of an interpolated grey scale corresponding to grey scale difference bits at respective locations of said transmitted bitmap image representation. This diminishes sharp grey scale contrasts.

Further, the inventive method may be advantageously applied in web-based applications between a Proxy-Server and an end user-associated device arranged for receiving said transmitted, reduced-color pixels of said bitmap image representation, and having only small computing and/or display resources.

In this respect a further performance enhancement is disclosed as follows:
At the client site, when receiving said transmitted, reduced-color pixels of said bitmap image representation (40), respective control program means are provided for processing a user control response responsive to the displayed bitmap image representation in form of a user-initiated control response, such as a mouse-click or any equivalent thereto at some X-Y-screen location, or any dedicated, predetermined pressing of a key, and for forwarding said user control response to said Proxy-Server, e.g. in form of a short control message comprising X,Y-coordinates and some bits encoding the nature of the control, left or right mouse button, double-click, etc.

In this respect at the Proxy Server, where a usual Web-browser is implemented, steps are performed as follows:
a) using control program means for transforming said user control response forwarded from said client device into a browser-specific user control command,
b) evaluating said command, and in case said command represents a network request, which after execution comprises the display of a bitmap image representation different to that which was transmitted in said first transmission process, and is to be refined by said second transmission process,
c) aborting the current first and/or second transmission processes as long as not yet completed, and
d) starting a new transmission process according to said browser-specific user control command.

Advantageously, when the result of said evaluation step b) comprises the execution of a hyper-link, or a link inside the accessed webpage, involving the display of a basically different screen in the Browser at the Proxy Server, this new screen is compressed and transmitted to the user instead of continuing to complete the display of the former screen, in which the link was actuated. Thus, the advantage results that the receiving user may immediately do something, for example continuing navigation, before the rest of the page is transmitted to him, even when only a part of the second or even the first transmission process is completed and respective bitmap information is displayed to the user. This is definitely advantageous for navigating between web pages or remote menu control of applications as it saves time enormously.

Further advantageously, said subset of colors is a 2-colors subset, preferred black/white one, whereby black color pixels are associated with said primary subset and are transmitted within said first transmission process.

Further, after the second transmission process the user may be given an option to request further image details e.g., True-Type-style or any intermediate resolution or color scale, as e.g., 1024 colors, or 4096 colors, etc.

When the above-mentioned subset of colours is a 2-colours subset, as e.g. a black/white subset, and when a specific type of information is associated with black and the rest of the image with white, then, transmission time can be saved significantly. When for example said selected type of information is important relative to the rest of information contained in the image, then, basically a filter criterion is applied, which advantageously provides for transmitting in said first transmission process only the important contents of the image. A good choice is to associate text information to said selected, specific type of information because in many cases text is overlaid to some graphical environment as it is the case in GUI-windows, for example.

Further, the black colour is preferably associated with the text information, and URL-specifying text, which is represented usually in blue colour in any web-site may be transferred to black colour, too. Thus, combining an improved compression for GUI-type data with the privileged transmission of text information over graphical information provides a significant technological progress in saving bandwidth for any application purposes the user wishes.

Further, a wide field of applications may take profit from the present invention, when the client communicates with a business application server just implementing any business application program, such as a spreadsheet application, a word processor, a database application or any other non-standard business application, whereby no interaction with the Internet takes place, ie, a scenario of FIG. 1 in which the right hand portion of FIG. 1, ie the Webserver, does not play a role. Thus, the invention may be used in any situation, in which GUI-data are to be transferred to a client in a communication channel, which has low capacity or where transmission of data is relatively costly such that the compression and the inventive client/server dialogue as disclosed in here is worth while doing. When the user control response is interpreted and executed at the application Server and results in a massively different bitmap representation, then the currently active transmission process to the client is also aborted and a new transmission process is started enabling a display of the application screen as freshly requested by the end-user at the client site. The criterion saying if there are "massive" differences or not, may preferably prefer the topmost and leftmost regions of a screen, as experience has shown that in the majority of program applications these are the screen regions, in which the most important information is displayed to the user. Further, it may be determined by calculation, what is to be preferred, either renew the screen already displayed at the client by transmitting the delta information between displayed screen and new screen, or restart and transmit the new screen totally from scratch.

Thus, from a today's user perspective this enables remote control of program applications of the GUI-type via low-bandwidth connections, like GSM-connections, as a primary example for low-bandwidth transmission. Also the use of the Internet or an Intranet as a specific case thereof is improved specifically for the low-bandwidth case between a mobile client and a respective proxy-server associated to the mobile client and a high-bandwidth linked web-server, respectively. Further, the advantage can also be exploited for high bandwidth connections like e.g. future UMTS connections, when the user must pay for the data volume transmitted.

Further details are given in the description of the preferred embodiment further below.

3. BRIEF DESCRIPTION OF THE DRAWINGS

The present invention is illustrated by way of example and is not limited by the shape of the figures of the drawings in which.

Figure 5:
FIG. 5 is the same webpage after being applied to the row-wise X-OR operation.
Figures 6, 7:
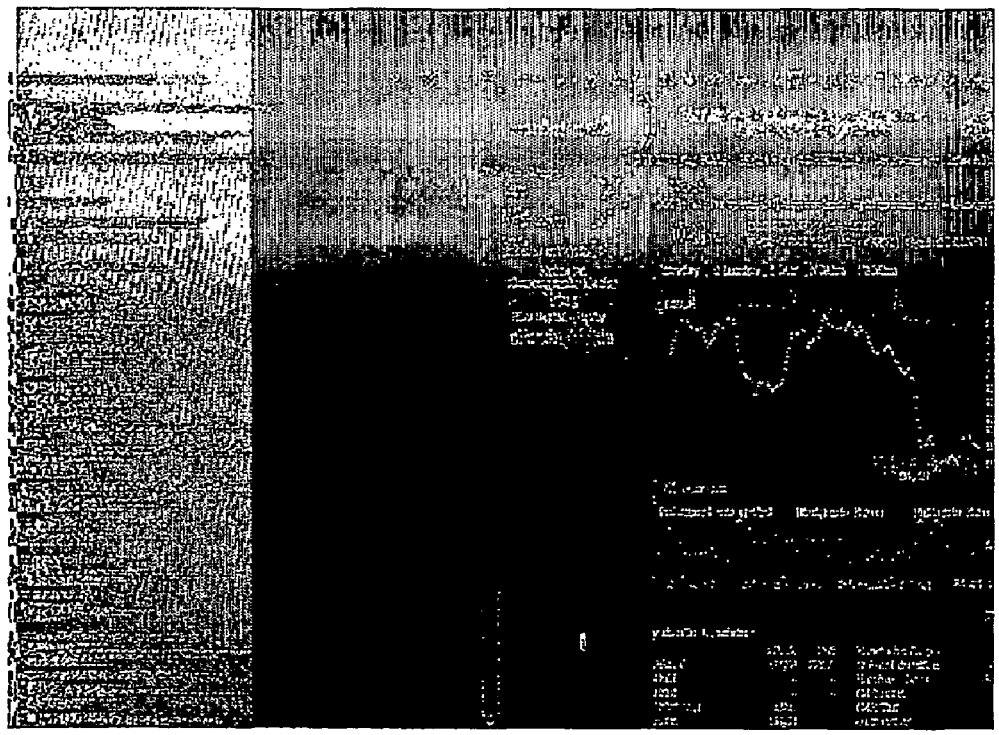

FIG. 6 illustrates the application of the columnwise X-OR operation to the picture of FIG. 5; and FIG. 7 is a table representation illustrating the positive effects of the proposed compression technique compared to the use of the best prior art compression format for the given type of low number of colour pictures, the .gif file format. The comparison is done on 7 representative portal pages of a customer portal.

4. DETAILED DESCRIPTION OF THE PREFERRED EMBODIMENT

Figure 1:
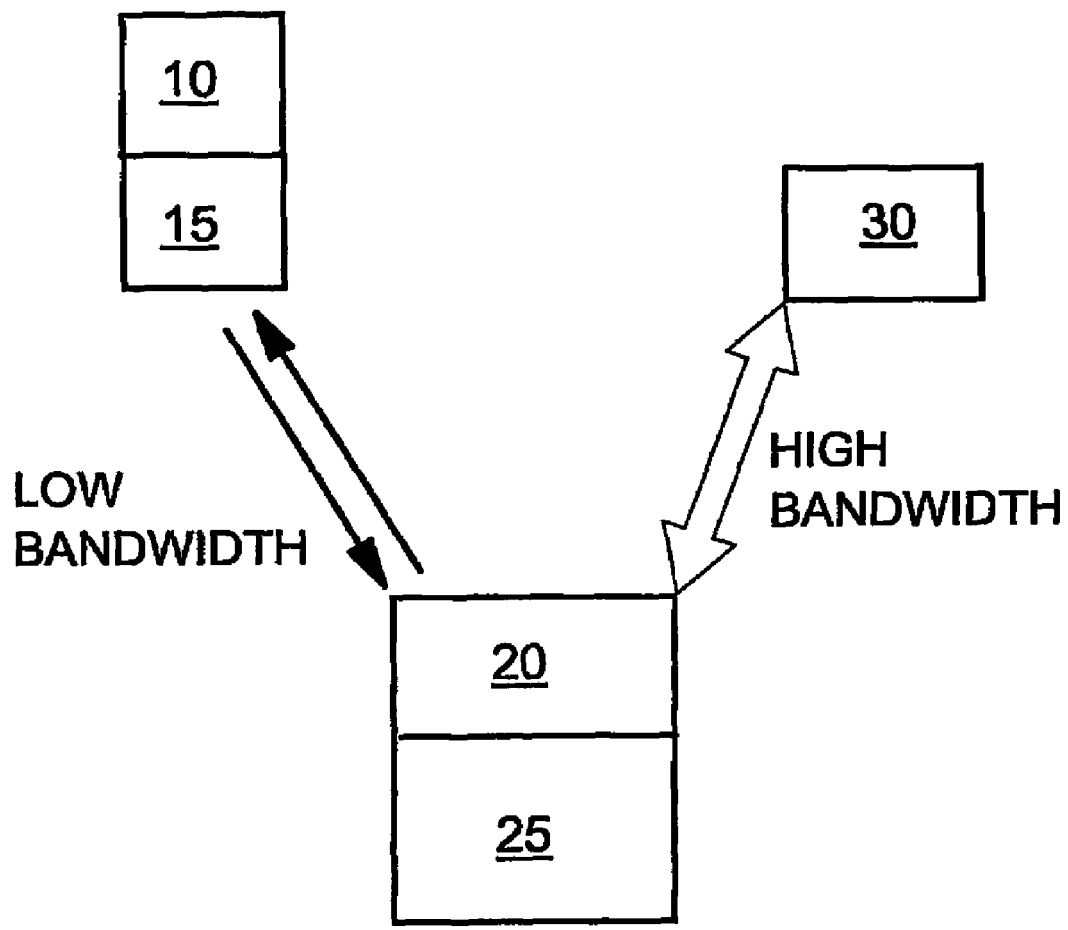
FIG. 1 is a schematic representation of the essential components in a system using the basic principles of the present invention when accessing the Internet or a backend application server from a client device via a low-bandwidth connection.

With general reference to the figures and with special reference now to FIG. 1 an application scenario is described in more detail illustrating how a mobile computer device and the user thereof, respectively, may advantageously take profit from the basic features of the present invention.

A mobile computer device, e.g. a notebook or a personal digital assistant (PDA) having reference sign 10, is assumed to need an Intranet/Internet access. In an alternative application case it may be assumed to need to remote-control a backend application. Both such applications are limited by a low-bandwidth network connection between device 10 and a proxy-server 20 which is associated to device 10. The low-bandwidth may be a standard GSM-connection having a bandwidth of 9.6 Kbps.

In case of mobile access to the Intranet, the user is assumed to need a portal access to his enterprise, for example. For this purpose, the proxy-server 20 is connected via a high-bandwidth connection to a web-server 30, which may be located at the enterprise side itself, e.g. via a high-bandwidth local network. In case the web-server is outside the enterprise, which may be assumed for Internet access, a larger bandwidth may also be assumed for the purposes of the present invention between proxy-server 20 and web-server 30.

Figure 4:
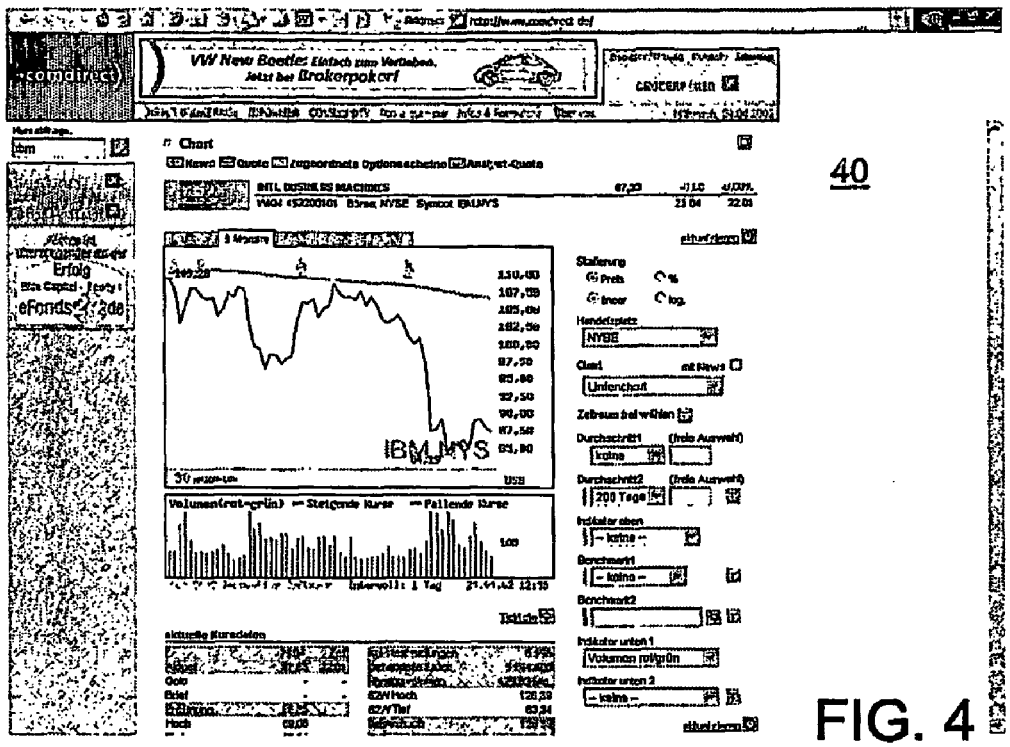
FIG. 4 is an example of a 4 colour grey scale screenshot of a Webpage.

According to FIGS. 1 and 4, and to a preferred embodiment of the invention, which is applied between said proxy server means 20 and the end user-associated device 10, e.g., a mobile client, said device 10 is arranged for receiving a bitmap image representation 40—see FIG. 4, in a reduced-color pixel format.

According to a particular advantageous aspect the following features are implemented:

a) a control program means 15 is used at the end user device 10 for forwarding an end user response, responsive to said transmitted bitmap image representation 40 to said proxy server means, and b) a control program means 25 is provided at the proxy server site for receiving and transforming said forwarded user response into browser-specific user control commands.

Said component 15 is responsible for detecting any user input on device 10 (keyboard key-pressing/mouse-click, touchpad-knocking, etc. . . . ) and for transmitting, ie forwarding this information, e.g. in form of a control message including only a small number of control bits encoding the X-Y position of the respective click and the type of user action, as it was mentioned above, to the proxy-server 20, where these interactions are placed and processed, as if they where done locally on this proxy-server.

This feature can be advantageously used to abort the current transmission(s), ie the first and second transmission processes or further ones, as mentioned above, and to start a new transmission controlled by said "mouse-click" and its "translation" by the Proxy Server. Thus, in this case, when the X-Y position in the bitmap displayed to the client-site end-user corresponds to the position of a Link or a Hyperlink in the respective bitmap at the Proxy Server, the Proxy Server's control program executes this link and aborts the former transmissions as they are now obsolete, as it is proved by the end-user performed "click" to said link. By that, user navigation inside the respective websites corresponding to such bitmap representations is significantly accelerated, as superfluous information is not transmitted at all, but instead, the new information, which seems to be more interesting to the end-user is transmitted to him, after the Proxy Server has received the new bitmap representation corresponding to the newly requested website. In case the Proxy Server is replaced by an Application Server, e.g. a Database Server, then the navigation in this application is significantly enhanced.

According to a further advantageous feature of the present invention a difference detection mechanism having again reference sign 25 is implemented at the server site, recording bitmap image representations 40, e.g. screenshots, periodically on the proxy-server 20 to detect any changes, eg. in the Browser Application running on proxy server 20 accessing the web server 30. Those changes will be transferred by the inventional methods to the receiving program component 15 at the client site, which uncompresses the transmitted information and then displays it on device 10. Preferably, only delta-information between screens is transmitted, which is per se known from prior art.

Figure 2:
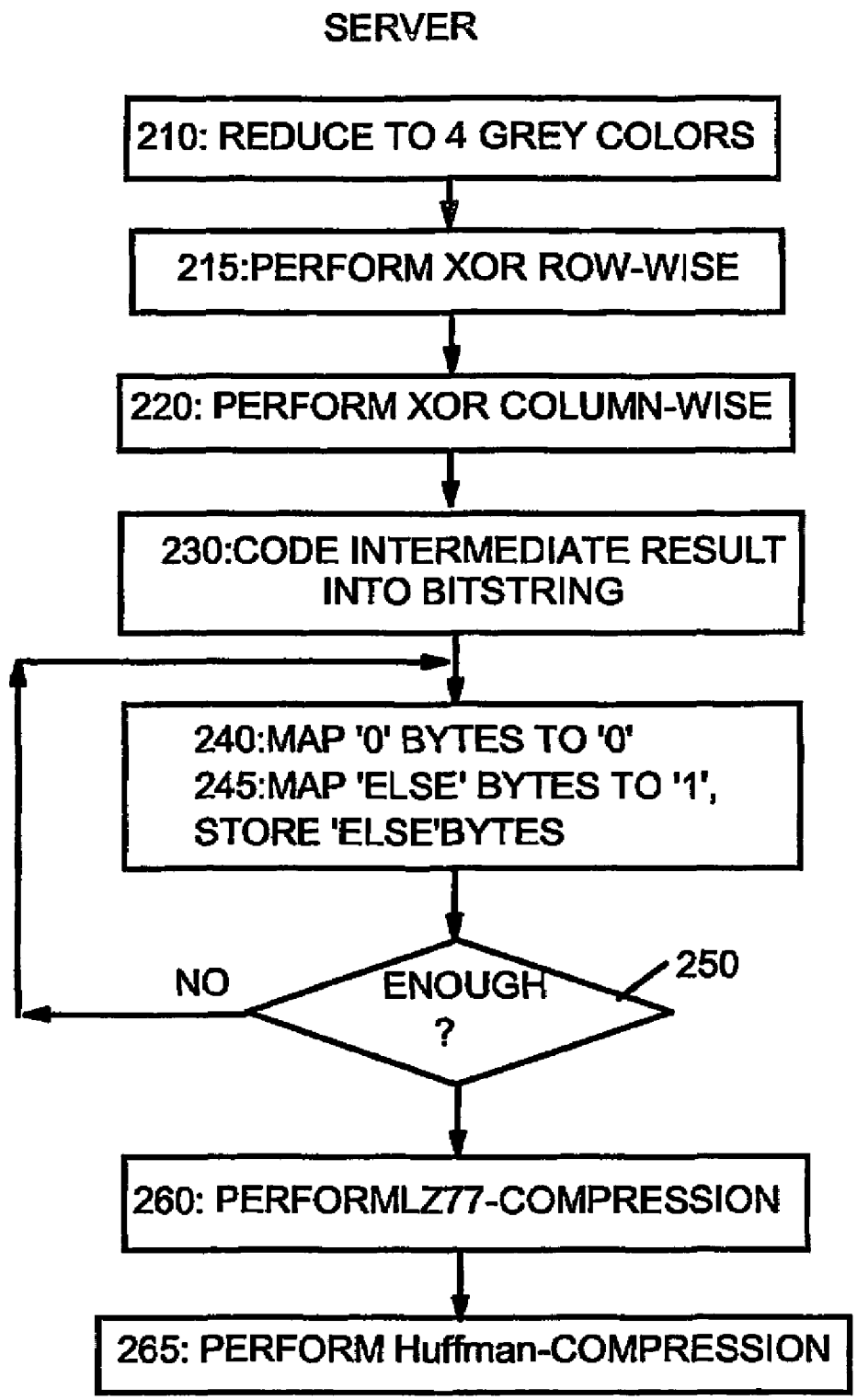
FIG. 2 is a schematic block diagram representation illustrating the control flow in the compression procedure according to the present invention.

With additional reference now to FIG. 2, first, further details are described when the inventional compression method is applied according to a preferred embodiment thereof. In a first step or pre-step 210 a screenshot visible at proxy-server 20 is quantisized, e.g. to reduce the colors to a number of 4 grey colours. The algorithm may control this colour reduction preferably to empirically found rules according to a respective application behind. For example, in order to collect all text information contained in web-based applications it is recommended to collect, beside of the mostly prevailing black text, the typical blue colour used usually for representing URLs to the black colour.

Further, other colours to be known to be used very often for text representation should also be mapped to the black colour. Alternatively, all text elements comprised of a screenshot may be filtered out by a separately provided text recognition engine and can be set to a predetermined, rarely used colour, in order to increase the ability of the method to differentiate between text and image information. This may be done by aid of usual markup tags. Due to this additional feature the inventive method may differentiate between black coloured areas located at different places in the screenshot and text information. A coincidence by hazard between the selected colourcode with single image pixels not belonging to the text information may be tolerated in regard of the enormous depth of the colour-range of 2 exp 24 colour-codes.

After having identified the text information it will be extracted from the image frame and is ready for transmission in a first transmission process. The resulting gaps in the screenshot are advantageously filled with pixels having the same colour-code at the adjacent region in the frame, or, if the adjacent regions in the frame have different colours, the gaps are filled advantageously with interpolated pixels. Thus, having a colour of red on the one side of a gap and a colour of yellow at the other side adjacent thereof, the gap will be filled with an orange-coloured pixel. This is done primarily in order to allow an efficient further compressibility of the remaining screen frame as a postponed compression method like JPEG will not recognise an edge, when the whole image frame is reduced to a low number-level grey-scale.

The next steps 215 to 265 as described next below are performed for each subset of bitmap bits, corresponding to a respective colour, preferably starting with the most important colour, which is often the black colour.

Thus, in a step 215 an X-OR operation is performed in a row-wise direction. This means in particular that the inventional method begins to compare the first row with the second row bit-wise. As the frame is already reduced to a number of 4 different grey colours each pixel is coded with 2 bits, for example the bits "00" coding black, "01" coding dark grey, "10" coding light grey, and "11" coding white. Only bits having the same column position are compared to each other. The result of the X-OR operation between the first and the second row replaces the first row. The result of the X-OR between the second and the third row replaces the second row, and so on, until the bottom line of the screen-frame is reached. The result is that only such locations are assigned a "1"-bit, where the pixel-code is different from one line to the other in the same column position. This procedure is described in more detail in the above-mentioned prior art reference. The result of step 215 is thus a compressed set of bit-strings which may be uncompressed again to deliver the former original bit-string without loss of information.

Further, advantageously, in a step 220 a similar X-OR operation is performed column-wise, beginning for example with the most left column in an analogous way, comparing bit-positions of the same row. This is an inventive feature, which can be advantageously applied in bitmaps having a larger number of rectangle-shaped graphical elements, and in particular, if such rectangle elements are uni-coloured.

In a next step 230 the compression result from step 215 and 220, which is referred to in here as an "intermediate result" is coded into a bit-string, preferably by repeatedly performing the following steps:
  mapping a byte having one or more '1' bits to a bit value of '1', and storing said byte in a retrievable manner, preferred, storing said '1' containing byte behind the compressed bitstring value,
  mapping a byte only consisting of '0' bits to '0'.

This is illustrated in FIG. 2 by aid of reference signs 240, 245 and 250. A more detailed description of this particular process is given in the above prior art reference.

The result may further be coded by a so-called LZ77-compression in a step 260 and further with the above-mentioned Huffman compression, step 265. This compression is somehow surprising since it is done on the already compressed output of step 250. The compression output from step 250 at least for screenshots on a small number of different colours has the feature of a low entropy, which makes the compression steps 260 and 265 worth being applied. It should be noted that other compressed image formats like GIF, JPEG, . . . have an entropy of roughly 8 [bits per byte] and therefore do not allow for an additional compression.

Then the above steps are repeated for the remaining subsets of bitmap bits.

Figure 3:
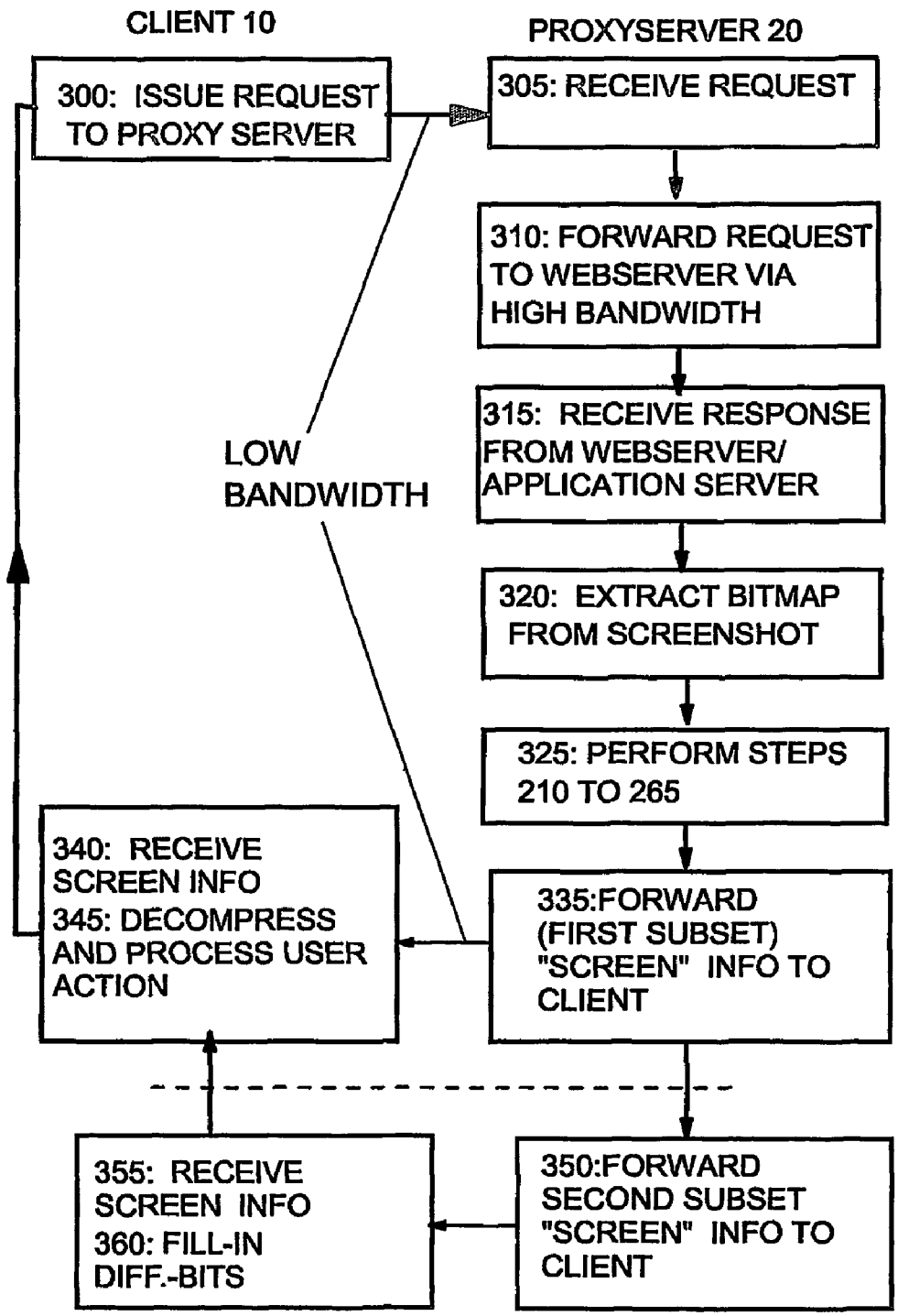
FIG. 3 is a schematic block diagram representation showing the control flow in an inventional embodiment of a transmission process enriched by both before-mentioned primary aspects of the present invention.

With additional reference now to FIG. 3 the second aspect of the present invention is described in more detail, in which a low-bandwidth transmission of such multi-colored screenshot of a graphical user interface (GUI-data), which usually arises in web-pages or screenshots of any desktop application program is pre-compressed by the above-described compression method and is then transmitted via a low-bandwidth connection to a remote client 10. Basically, the client 10 communicates via a dedicated browser proxy 20, which processes web-contents requested by the client 10 and transmits them to the client 10. This situation is described above with reference to FIG. 1. Compressed-bit transmissions are done for each subset separately, beginning with the most important one. Details are as follows:

In a first step 300 the client issues a request to its proxy-server 20. In case, the client application starts from scratch and may be assumed as an Intranet session the client end-device 10 has a kind of "ultra-light" browser implementation which is used for issuing the request to the proxy-server. In a next step 305, see the right hand column of activities in FIG.

3, which are all associated to the proxy-server 20, the proxy-server 20 receives the request. This request may be assumed now to contain an URL indicating a web-site the user at client device 10 wants to see. In a next step 310 proxy-server 20 forwards the request to a respective web-server via a high-bandwidth connection. This might be an Intranet or an Internet connection connecting between any two points in the world. In a next step 315 the proxy-server receives the response from said web-server.

A particularly provided logic referred to in here as Proxy Control Logic (PCL) 25 extracts a bitmap in a step 320 from the screen which is offered to the user.

Then, in order to compress the screen shot the steps described above with reference to FIG. 2 above are performed, the result of which is that the compressed bitmap information is forwarded in a step 335 as a "screen" to the client.

Then, in step 340 the client 10 receives the screen.

With additional reference back to FIG. 1 the client control logic (CCL) 15 uncompresses the compressed data where necessary, see step 345 in FIG. 3, and is ready to receive user-input for the case that the user wants to perform any typical user action, as e.g. requesting a further URL, clicking on some object comprised of the screenshot, which may be for example a hyperlink, etc. A further option is given to the user to request more image information from the currently displayed screenshot. This may be relevant, for example when the user stops to navigate and wants to have a detailed look (more shades of grey) at some particular web-page. Thus, control is fed back to step 300, in order to enable the client user 10 to issue any further request to his proxy-server 20. This way the procedure described above and illustrated by way of FIG. 3 may be repeated as long as required by client 10 user.

As depicted in the bottom portion of FIG. 3 the inventive transmission method may further be enhanced advantageously by the before-mentioned transmission taking place in two different processes:

Preferably, the first transmission process 335 transmits the bits corresponding to a primary subset of such pixels of a screenshot which are considered to be important for the user (because they may contain control information or text information) and is followed by a second transmission process 350 transmitting bits corresponding to a secondary subset of the pixels of said screenshot. This second transmission transports pixel information representing less important pixels, for example other than black color, or text representing pixels. Such secondary subset is received, step 355, and filled-in in the display representation of client 10, step 340, which already contains the first-important-subset of information. Advantageously, in one transmission a single or a plurality of non-primary, ie secondary, third, fourth, etc., subsets may be transmitted as it seems best suited for a respective application.

In a particular example the first transmission transports black color and text information, whereas the second transmission comprises three other grey colors, representing the rest of information. In this particular case a special advantage may be taken profit of, which is "hidden" behind some mathematical context:

The sum resulting from a coding a)+coding b)<coding c), which reads in detail:
a) coding of a 1-bit black/white image;
b) coding of a 2-bit greyscale image comprising 3 "grey-colors: dark-grey, light-grey and white; is smaller than the
c) coding of a 2-bit, 4 "grey-colors" comprising image, comprising the colors black, dark-grey, light-grey and white.

It should be noted that the mapping rules for case a) is preferably:

In the compressed code the color black is used where black was found in the original image, white is used else.

Case b):

Dark grey is used where dark grey was in the original image, Light grey is used where light grey was in the original image, White is used where white was in the original image, further it has the color "XX" at the locations, where the original image was black. Advantageously, "XX" is a free-to-select color that may be used freely and thus can also be defined by the compression algorithm dependent of the actual needs of a current applicational case in use.

With further reference now to FIGS. 4-6, a 4-colour greyscale screenshot 40 is depicted in FIG. 4. After the row-wise X-OR operation is applied the result is given in FIG. 5. FIG. 6 shows the application of the column-wise X-OR operation (on the right part of the picture).

With reference to FIG. 6, additionally on the left part thereof the actual 0/1-coding for each line is illustrated, before the compression steps 260 and 265 are performed. The Y-axis represents the rows of a respective screen image, and X-axis represents the storage need. A break-even line is depicted separating regions in which the inventive compression is advantageous (red background), from regions in which it ist disadvantageous to be applied (black background). This helps to give a realistic impression to a person skilled in the art, how a screen may be shaped, when considerable advantages may be expected, when applying the inventive concepts. In particular, the border between the white colour peaks and black background colour is the break-even point for the compression to work, that is, the more white is visible, the better the compression works.

FIG. 7 represents a realistic sample by way of a table representation illustrating the excellent compression results achieved according to the present invention. The postive effects of the proposed compression technique are shown compared to the use of the best known compression format for the given type of low number of colour pictures, the .gif file format. The comparison is done on 7 representative portal pages of a freely selected customer portal.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following
a) conversion to another language, code or notation;
b) reproduction in a different material form.

The invention claimed is:

1. A method for processing digital data from a row-column structured multi-color bitmap image representation, comprising the steps of:
   a) reducing said bitmap image representation from an initial number of colors to a reduced number of colors to form a reduced bitmap, each color of the reduced number of colors in the reduced bitmap corresponding to a respective subset of bitmap bits of a set of bitmap bits;
   b) for at least one subset of said subsets, performing the following steps:
      b1) performing a row-wise XOR operation on a first and second row of each pair of successive rows of said reduced bitmap to generate a resultant row that replaces said first row, yielding a first intermediate result after said row-wise XOR operation has been performed on all pairs of rows of the reduced bitmap,
      b2) coding said first intermediate result into a bit string yielding a second intermediate compression result by repeatedly performing the following mapping steps: b2a) mapping a byte having one or more '1' bits to a bit value of '1', and b2b) mapping a byte consisting of '0' bits to a bit value of '0',
      b3) applying an additional compression to said second intermediate compression result to yield an additional compression result.

2. The method of claim 1, said method further comprising the step of performing a column-wise XOR operation on said reduced bitmap after step b1).

3. The method of claim 1, wherein said additional compression comprises a Huffmann compression.

4. The method of claim 1, wherein said additional compression comprises a LZ77 compression.

5. The method of claim 1, wherein the subsets comprise 256, 16 or 4 scales of color or grey, and wherein steps b1) to b3) are performed for two or more of said subsets.

6. The method of claim 1, wherein the method comprises deducing the image representation from a screenshot associated with a computer program application.

7. The method of claim 1, wherein the at least one subset comprises a plurality of subsets, and wherein after step b), the method further comprises the steps of:
   c) determining a primary subset and at least one secondary subset from the plurality of subsets;
   d) transmitting bits corresponding to said primary subset in a first transmission process from a proxy server to a client; and
   e) transmitting bits corresponding to said at least one secondary subset in a second transmission process from the proxy server to the client subsequent to said first transmission process.

8. The method of claim 7, wherein the set of bitmap bits consists of 1 bit, wherein the primary subset represents black, and wherein the at least one secondary subset consists of a single subset representing white.

9. The method of claim 7, wherein text information comprised by said image representation is mapped to the primary subset.

10. The method of claim 7, wherein the set of bitmap bits consists of 2 bits, wherein the primary subset represents black, and wherein the at least one secondary subset consists of a three subsets respectively representing dark-grey, light-grey, and white.

11. A computer program product, comprising a computer readable medium having a computer program embodied therein, said computer program adapted to implement a method for processing digital data from a row-column structured multi-color bitmap image representation, said method comprising the steps of:
   a) reducing said bitmap image representation from an initial number of colors to a reduced number of colors to form a reduced bitmap, each color of the reduced number of colors in the reduced bitmap corresponding to a respective subset of bitmap bits of a set of bitmap bits;
   b) for at least one subset of said subsets, performing the following steps:
      b1) performing a row-wise XOR operation on a first and second row of each pair of successive rows of said reduced bitmap to generate a resultant row that replaces said first row, yielding a first intermediate result after said row-wise XOR operation has been performed on all pairs of rows of the reduced bitmap,
      b2) coding said first intermediate result into a bit string yielding a second intermediate compression result by repeatedly performing the following mapping steps:
      b2a) mapping a byte having one or more '1' bits to a bit value of '1', and b2b) mapping a byte consisting of '0' bits to a bit value of '0',
      b3) applying an additional compression to said second intermediate compression result to yield an additional compression result.

12. The computer program product of claim 11, said method further comprising the step of performing a column-wise XOR operation on said reduced bitmap after step b1).

13. The computer program product of claim 11, wherein said additional compression comprises a Huffmann compression.

14. The computer program product of claim 11, wherein said additional compression comprises a LZ77 compression.

15. The computer program product of claim 11, wherein the subsets comprise 256, 16 or 4 scales of color or grey, and wherein steps b1) to b3) are performed for two or more of said subsets.

16. The computer program product of claim 11, wherein the method comprises deducing the image representation from a screenshot associated with a computer program application.

17. The computer program product of claim 11, wherein the at least one subset comprises a plurality of subsets, and wherein after step b), the method further comprises the steps of:
   c) determining a primary subset and at least one secondary subset from the plurality of subsets;
   d) transmitting bits corresponding to said primary subset in a first transmission process from a proxy server to a client; and
   e) transmitting bits corresponding to said at least one secondary subset in a second transmission process from the proxy server to the client subsequent to said first transmission process.

18. The computer program product of claim 17, wherein the set of bitmap bits consists of 1 bit, wherein the primary subset represents black, and wherein the at least one secondary subset consists of a single subset representing white.

19. The computer program product of claim 17, wherein text information comprised by said image representation is mapped to the primary subset.

20. The computer program product of claim 17, wherein the set of bitmap bits consists of 2 bits, wherein the primary subset represents black, and wherein the at least one secondary subset consists of a three subsets respectively representing dark-grey, light-grey, and white.

* * * * *